United States Patent Office 2,718,778
Patented Sept. 27, 1955

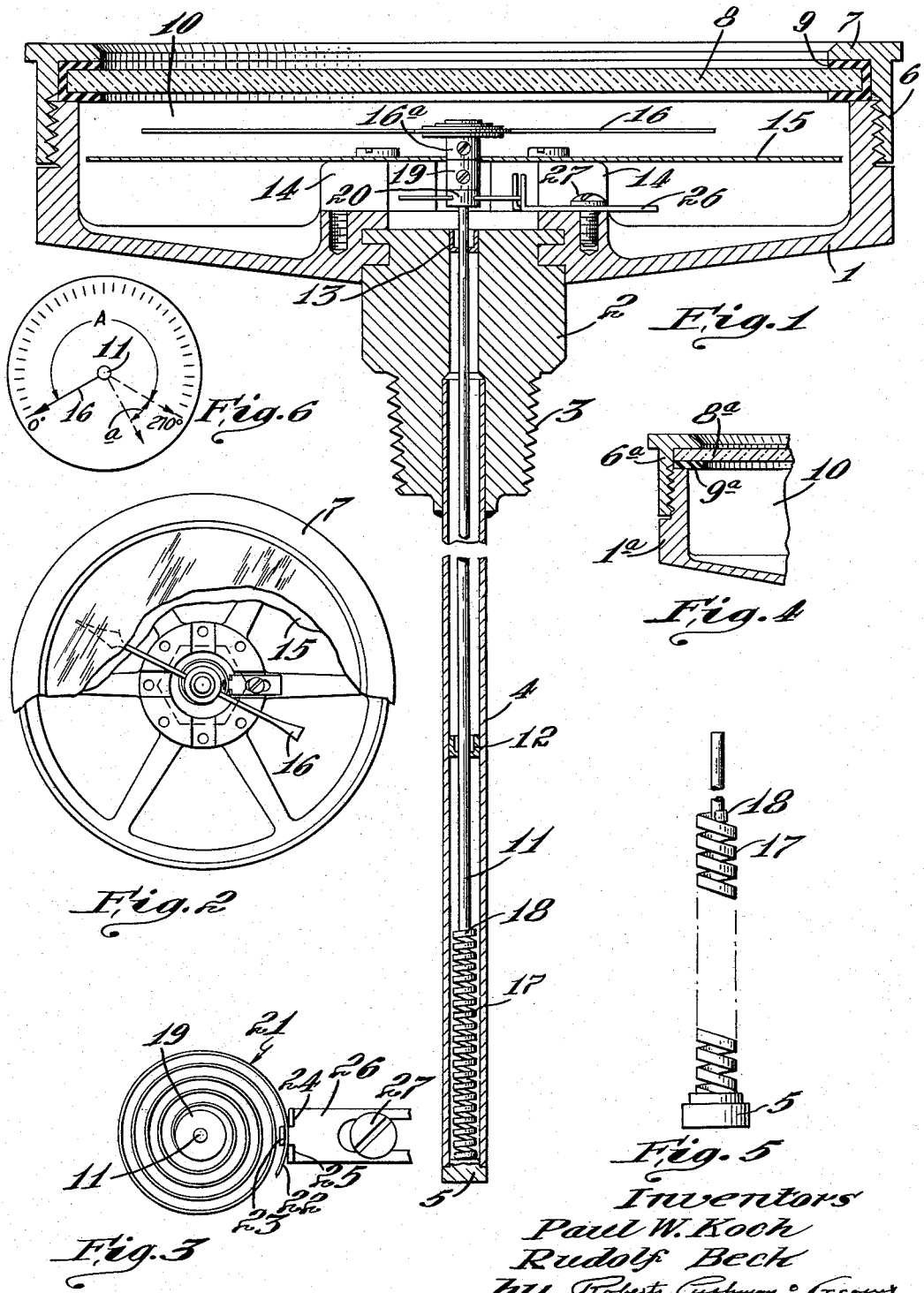

2,718,778

METHOD OF MAKING A DIAL INSTRUMENT EMPLOYING BIMETALLIC MOTOR MEANS

Paul W. Koch, Danbury, and Rudolf Beck, Fairfield, Conn., assignors to Manning, Maxwell & Moore, Incorporated, New York, N. Y., a corporation of New Jersey Application June 27, 1951, Serial No. 233,802

4 Claims. (Cl. 73—1)

This invention pertains to a method of making dial instruments of the kind wherein the motor means for moving the pointer is a bimetallic coil. For specific illustration, but without limitation, the invention is here illustrated and described as embodied in a dial thermometer.

In instruments of this type a pointer is moved over a graduated dial by the action of a bimetallic coil. As a practical matter, the coil is usually fixed at one end to the casing or housing of the instrument, the other end of the coil being fixed to a shaft to which the pointer is secured.

Customarily, in dial instruments, the graduations extend through an arc of approximately 270°; thus, if the thermometer is to have a range of 100°, for example, the coil should move the pointer through 270° of arc as the temperature increases from the lowest to the highest limit of the range for which the instrument is designed.

Were it possible to prepare bimetallic coils on a commercial scale which were accurately alike, no particular difficulty would be experienced in the manufacture of such instruments. But, as a practical matter, it is substantially impossible, using reasonable manufacturing tolerances and methods, to obtain an accuracy better than 10%. For example, any two selected coils made under the same conditions may vary from 5 to 10% or more in the number of angular degrees through which the ends of the respective coils deflect in response to the same temperature variation. Good commercial practice requires an accuracy within 1% or better in the completed instrument. Thus, in making such instruments it is necessary, in one way or another, to calibrate each instrument with respect to the particular coil used. Different methods have heretofore been employed in obtaining the desired degree of accuracy. In accordance with one method, the bimetallic coils are made (as is readily possible) so that the 5 to 10% manufacturing variation is all on the excess side as referred to the desired angular deflection. That is to say, the coils deflect too much for the given temperature range. Each individual coil is then tested for deflection and is shortened according to the results of the test so that it will give the desired angle of deflection. Since, as above noted, these coils are permanently mounted within the housing of the instrument, with one end fixed to the housing or casing and the other to the shaft, it is necessary to make this test before the coil is installed in the case. This operation, in general, is slow and expensive and not always productive of accuracy. Another method heretofore used has been to provide dials having different graduation angles, varying one from another by sufficiently small intervals so that by selection from among these dials of one having the proper range angle, it is possible to match the dial to the given coil so as to reduce the error within the limits permitted. This method requires a large inventory of dials, especially if thermometers with a number of different temperature ranges are being manufactured, and is also slow and expensive in its application and not really accurate.

The present invention has for its principal object the provision of a novel and rapid, direct method of making such instruments whereby at a relatively low cost (as compared with prior cut and try methods) to insure accuracy of operation. Other and further objects and advantages of the invention will be pointed out in the following more detailed description and by reference to the accompanying drawings wherein Fig. 1 is a diametrical section through a dial instrument made according to the present method;

Fig. 2 is a plan view, to smaller scale than Fig. 1, a portion of the dial and cover glass being broken away;

Fig. 3 is a fragmentary, horizontal section through the staff which carries the pointer, showing the hair spring of the instrument together with its anchorage;

Fig. 4 is a fragmentary, radial section through the case of the instrument illustrating a slight modification;

Fig. 5 is a fragmentary elevation of the bimetallic coil and the shaft which is turned by the coil, a portion of the shaft being broken away; and Fig. 6 is a diagram useful in describing the method.

Broadly stated, the present invention involves the use of a bimetallic coil so designed that manufacturing variations are all in excess of the desired angular deflection, but instead of calibration by changing the lengths of these bimetallic coils, calibration is accomplished by adding a load which will so reduce the excessive angular deflection of the coil as to bring the instrument within the required degree of accuracy. Specifically, the added load is provided by a coil spring of the hair spring type arranged to oppose turning of the pointer staff by the bimetallic coil; this hair spring is cut to a length according to a mathematical formula, thereby to provide the desired load. By this procedure it becomes possible to mount the bimetallic coil permanently within the casing and then, while it is in place, to determine its torque characteristics and to apply the prepared hair spring in a very simple and inexpensive operation.

This procedure is made possible by the fact that for a spring of the hair spring type, coiled from wire of a given material and of given cross-section, and when loaded at a given distance from its center, the deflection under load varies as a function of the length of the wire making up the coil and is independent of the radius of curvature of the coil.

Before entering upon a specific description of the method employed in accordance with the present invention, an instrument resultant from the practice of the improved method will now be described.

In the drawings, the numeral 1 designates the main case of the instrument, this case having a central fitting 2 which may be integral with the case, although here shown as an independent part fixedly united to the case proper. This fitting 2 is provided with an externally screw-threaded nipple portion 3 designed to be screwed into an aperture in a vessel whose interior temperature is to be indicated. From the lower end of the nipple portion 3 there extends a rigid tubular stem 4, fixed at its upper end in the nipple, for example, with a press fit or by means of silver solder or brazing, and which is closed at its lower end by a plug 5 which is permanently secured in place by solder or brazing.

The upper portion of the case 1 is externally screw threaded for the reception of a bezel ring or cap 6 having an inwardly directed annular flange 7 designed to hold in place the transparent cover plate or panel 18. As illustrated in Fig. 1, the margin of the plate 8 is set into a U-shaped annular gasket 9 which protects the glass panel from mechanical injury and which provides a tight seal for the space 10 within the case. This arrangement is desirable in instruments designed for moderate temperature ranges, for example, up to 400° F., but for instruments to be used with higher temperatures, the arrangement illustrated in Fig. 4 is preferred wherein the case $1^a$ has the bezel ring $6^a$ which holds the transparent panel $8^a$ in place, but, in this case, the gasket $9^a$ is a simple annulus which underlies the lower surface of the transparent panel, thus providing for a heavier pressure between the glass panel and the bezel ring than in the arrangement of Fig. 1. However, the particular arrangement for securing the glass panel in place forms no essential part of the present invention.

A pointer staff or shaft 11 (Figs. 1 and 5) is journaled in a bearing 12 provided within the tubular stem 4 and in a second bearing 13 provided within the upper part of the casing member 2.

The casing 1 is provided with supporting bosses 14 on which the dial 15 rests and to which the dial is secured in any desired way. This dial is uniformly graduated (Fig. 6) for the desired temperature range, the graduations extending, for example, through an angular arc exceeding 90° and usually 270°.

Above the dial 15 the pointer 16 is arranged, the pointer having a hub $16^a$ by means of which the pointer is secured to the upper end of the staff or shaft 11, the hub being provided with a set screw, or the like, for securely holding it in place.

Within the lower part of the tubular stem 4 there is arranged a bimetallic coil 17 (Figs. 1 and 5) here shown as a substantially cylindrical, helical coil of conventional type, the lower end of this coil being fixedly secured, as by silver solder or the like, to the plug 5 while its upper end is secured in similar way at 18 to the lower end of the shaft 11.

Mounted on the upper portion of the shaft 11, just below the dial 15, is a hub 19 which may be integral with or secured in any desired way to the collet 20 to which the inner end of the coiled hair spring 21 is secured. The outer end 22 of this hair spring is fixed between upstanding fingers 23, 24 and 25 (Fig. 3), for example, by pinching the fingers against the end of the spring, these fingers being carried by an adjustable slide 26 secured to the casing 1 by a screw 27.

The bimetallic coil operates in the usual fashion to turn the shaft 11, but the hair spring 21 is so arranged that it opposes motion of the pointer in response to temperature increase. As above pointed out, the bemetallic coil is prepared by conventional mass production methods, by which it is readily possible to obtain a deflection angle which exceeds the desired deflection, but not more than 10%.

Let it be assumed that the proper deflection angle for the chosen scale is represented by the character A (Fig. 6) and that the actual deflection of the bimetallic coil, as prepared, may be represented by $A+a$, where $a$ is the excess deflection angle (see Fig. 6). The actual excess deflection of a given coil is quickly and accurately determined by temporarily fixing a pointer to the coil and then observing the deflection when the coil is heated from 0° F. to 100° F., this being the deflection $A+a$. No cutting of the coil or other modification if its size or characteristics is then necessary before it is permanently installed in the case of the instrument. Having assembled the bimetallic coil 18 with its shaft 11 within the casing in their permanent position of use, and having installed the dial and fixed the pointer to the shaft, the mechanical torque T required to deflect the bimetallic coil through the desired angle A is readily measured, first by positioning the instrument so that the pointer P is horizontal and the axis of the shaft 11 is also horizontal, and then attaching a small weight W to the pointer at a distance $r$ from the axis of the shaft 11, and turning the instrument so that the pointer is again horizontal. Assume that the case has to be turned through an angle $d$ to bring the pointer back to horizontal position. The turning moment T of the weight W is $Wr$;—then $$T:Wr=A:d$$

that is to say, the ratio of torques equals the ratio of angles.

Therefore $$T=\frac{AWr}{d}$$

The problem is then to provide a hair spring which will oppose such a torque $t$ to the movement of the pointer, as will compensate for the excess deflection $a$ of the bimetallic coil, so that the latter will deflect through the angle A instead of through the angle $A+a$. This torque $t$ may be found as follows:

$$T:T+t=A:A+a$$

from which $$Ta=tA$$

$$\frac{Ta}{A}=t$$

Since the deflection of a coiled spring of the hair spring type varies inversely as the first power of the length of the wire forming the coil, such a spring may be stiffened by shortening it. In accordance with the present invention, a hair spring of excess length L is first prepared (such a spring having a torque $t_s$ which is less than the final desired value $t$).

Let $c$ be the length which is to be cut from the hair spring which was initially prepared, then $$L-c:L=t_s:t$$

$$L-c=\frac{t_s\times L}{t}$$

$$c=L\left(1-\frac{t_s}{t}\right)$$

Having determined by the above formula the length $c$ to be clipped from off the hair spring, the latter is shortened by cutting off a piece of length $c$ from its outer end.

The pointer and dial are now removed from the case, the shortened hair spring is mounted on the shaft 11 by sliding its hub 19 and collet 20 down along the shaft and then fixing the hub to the shaft by a set screw or the like, and the free end of the shortened hair spring is placed between the arms 23, 24 and 25 of the slide 26 and the arms are bent to hold the end of the spring in fixed position. The dial and pointer are then re-applied and the bezel ring assembled with the case, thus completing the instrument, no further calibration being necessary.

While the operation as thus described may appear complicated, it is, in fact, very simple and permits mass production and stocking of the instrument with its permanently assembled bimetallic coil and associated parts. The test determination of the torque T of any given instrument is a simple matter, and likewise the determination of the proper length to be cut from the hair spring, these operations being easy to perform and requiring but little skill.

Since hair springs can be shortened only in a certain maximum ratio, it is desirable to provide hair springs in a range of initial lengths to take care of the range $a$ of inaccuracy in the commercially prepared bimetallic coils. For example, assuming that the range of inaccuracy does not exceed 10%, a bimetallic coil may have a torque T of one inch ounce for the desired dial angle $A=270°$. Thus for this condition $T=1$. Since the possible variation is from 1% to 10%, the corrective torque $t$ may be required to vary anywhere from 0.01 and 0.1 inch ounces.

Assume that a hair spring can be shortened to a maximum ratio of 2.0 to 1, then a set of springs may be prepared wherein the lightest spring for a torque of 0.01 inch ounces can be shortened to give a maximum torque of 0.022 inch ounces. The next hair spring of the series would be prepared to have a minimum torque of 0.022 inch ounces and could be shortened so as to provide a maximum of (0.2) (0.022) or 0.048 inch ounces. The third hair spring of the series would have a torque of 0.048 inch ounces and would be shortened to provide a maximum torque of (2.2) (0.048) which gives 0.106 inch ounces which is close enough to meet the maximum requirement.

While in the above description the instrument selected for illustration has been a dial thermometer, it is obvious that the same principle of compensation may be applied for the calibration of other instruments wherein a bimetallic coil is the motor means for moving a part between desired limits. Furthermore, while a specific embodiment of the invention has here been illustrated and described by way of example, it is to be understood that this is merely by way of illustration and that the specific means of mounting the bimetallic coil and the specific elements, aside from the hair spring hereinabove described, as forming a part of the instrument, are not to be considered essential features of the invention.

We claim:

1. That method of making calibrated dial thermometers thereby to make possible the employment of dials all having the same scale angle and wherein, in each thermometer, a pointer is moved over a graduated dial through a scale angle A by a bimetallic coil, said method comprising as steps assembling with the dial and pointer a bimetallic coil such that, if it were exposed to the maximum temperature indicated by the scale and unopposed, it would move the pointer beyond the upper limit of the scale through an angle $a$ not exceeding a predetermined percent of the scale angle A, and so assembling with the bimetallic coil means imposing on the coil, a mechanical torque $$t = \frac{a}{A} \cdot T$$

(wherein T is the mechanical torque which, if applied to the bimetallic coil, would move the pointer through the angle A only) as to oppose response of the coil to temperature rise, thereby preventing motion of the pointer beyond the upper limit of the scale when the instrument is subjected to the maximum temperature indicated by the scale.

2. Method according to claim 1, wherein the angle $a$ lies within a range of from 0.0% to 10% of the angle A and wherein the means for applying opposing mechanical torque to the bimetallic coil comprises a spiral hair spring having the torque $t$.

3. That method of making calibrated dial thermometers thereby to make possible the employment of graduated dials all having the same scale angle A, and wherein each thermometer has a pointer secured to a rotatable staff which is turned by the action of a bimetallic coil, said method comprising as steps providing a bimetallic coil such that when it is subjected to the maximum temperature indicated by the scale it would move the pointer, if unopposed, through an angle $a$ beyond the upper limit of the scale, said angle $a$ being within the range of from 0.0% to 10% of the scale angle A, permanently installing said coil and a pointer staff within a suitable case, mounting a graduated dial within the case, the lower and upper limits of the dial scale being the lower and upper limits of the scale angle A, applying a pointer to the staff, and by subjecting the coil to the minimum and maximum temperatures indicated on the dial fixing the angle $a$ for said particular coil, removing the dial and pointer from the case and installing within the case means operative to apply to the bimetallic coil such a mechanical torque $$t = \frac{a}{A} \cdot T$$

(where T is the mechanical torque which, if applied to the bimetallic coil, would move the pointer through the angle A only) as to oppose movement of the pointer in response to temperature increase, and then restoring the dial and pointer to operative position within the case.

4. That method of making a calibrated dial instrument wherein a pointer mounted on a staff is designed to swing through an arc of angular extent A, over a graduated dial, between two terminal points by means of a bimetallic coil, and wherein the coil has been so selected that, if unopposed, it would turn the staff so as to carry the pointer beyond one of said terminal points by an angular extent $a$, assembling the coil, its staff and the pointer within a casing, positioning the assembly so that the pointer is horizontal and the axis of the staff is also horizontal, attaching a weight W to the pointer at a distance $r$ from the axis of the staff, thereby deflecting the pointer from its horizontal position, turning the entire assembly about the axis of the staff through an angle $d$ such that the pointer is again horizontal, providing a hair spring having a torque $t$ according to the formula $$t = T\frac{a}{A}$$

where $$T = \frac{AWr}{d}$$

said hair spring being formed by taking a spring of initial length L, having a torque $t_s$ less than the desired torque $t$, cutting from said spring a length $$c = L\left(1 - \frac{t_s}{t}\right)$$

removing the pointer and dial from the case, fixing one end of the hair spring, formed as above, to the staff and securing its opposite end to a normally fixed abutment, and then reassembling the dial and pointer with the other parts within the case.

References Cited in the file of this patent

UNITED STATES PATENTS

| | | |
|---|---|---|
| 1,417,695 | Smith | May 30, 1922 |
| 1,708,900 | Roller | Apr. 9, 1929 |
| 1,923,680 | McCabe | Aug. 22, 1933 |
| 2,457,286 | Tollefsen et al. | Dec. 28, 1948 |
| 2,473,581 | Ford | June 21, 1949 |
| 2,572,059 | Schlaich | Oct. 23, 1951 |

FOREIGN PATENTS

| | | |
|---|---|---|
| 468,701 | Great Britain | July 8, 1931 |